(12) United States Patent
Morgan et al.

(10) Patent No.: US 8,343,406 B2
(45) Date of Patent: Jan. 1, 2013

(54) PROCESS FOR MANUFACTURING GOLF BALLS HAVING MULTI-LAYERED COVERS

(75) Inventors: William E. Morgan, Barrington, RI (US); Michael J. Sullivan, Barrington, RI (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 13/088,595

(22) Filed: Apr. 18, 2011

(65) Prior Publication Data

US 2012/0261860 A1    Oct. 18, 2012

Related U.S. Application Data

(63) Continuation of application No. 13/088,564, filed on Apr. 18, 2011.

(51) Int. Cl.
*B29C 39/18*    (2006.01)

(52) U.S. Cl. ........ 264/254; 264/267; 264/275; 264/261; 264/262; 264/255

(58) Field of Classification Search ........................ None
See application file for complete search history.

(56) References Cited

U.S. PATENT DOCUMENTS

| | | | | |
|---|---|---|---|---|
| 720,852 | A * | 2/1903 | Smith | 473/374 |
| 5,820,485 | A * | 10/1998 | Hwang | 473/361 |
| 6,293,877 | B1 * | 9/2001 | Boehm | 473/371 |
| 6,299,550 | B1 * | 10/2001 | Molitor et al. | 473/354 |
| 6,342,019 | B1 * | 1/2002 | Boehm et al. | 473/378 |
| 6,461,252 | B1 | 10/2002 | Yamagishi et al. | |
| 6,685,579 | B2 | 2/2004 | Sullivan | |
| 6,685,580 | B2 | 2/2004 | Sullivan | |
| 6,773,364 | B2 * | 8/2004 | Sullivan et al. | 473/370 |
| 6,875,132 | B2 | 4/2005 | Hayashi et al. | |
| 7,022,034 | B2 * | 4/2006 | Sullivan et al. | 473/374 |
| 7,125,347 | B2 * | 10/2006 | Kawamatsu | 473/378 |
| 7,131,915 | B2 | 11/2006 | Sullivan et al. | |
| 7,427,243 | B2 | 9/2008 | Sullivan | |

(Continued)

*Primary Examiner* — Edmund H. Lee
(74) *Attorney, Agent, or Firm* — Margaret C. Barker

(57) ABSTRACT

The invention is directed to a process for making a golf ball having a multi-layered cover including a very thin outermost cover layer, the process comprising for example: forming first and second substantially hemispherical half shells having a thickness and comprising a thermoplastic composition, each half shell further having an outer surface and an inner surface, the inner surface forming an hemispherical cavity; securing the first half shell in a golf ball mold; securing a core subassembly in a subassembly holder; dispensing an uncured liquid thermoset composition into the hemispherical cavity of the first half shell; inserting a first half of the core subassembly into the hemispherical cavity of the first half shell and displacing an amount of the uncured liquid thermoset composition such that the uncured liquid thermoset composition forms an inner cover layer having a thickness; disengaging the core subassembly from the subassembly holder when the thermoset composition has gelled to a point of rigidity; securing the second half shell in a golf ball mold; dispensing the uncured liquid thermoset composition into the hemispherical cavity of the second half shell; inserting a second half of the core subassembly into the hemispherical cavity of the second half shell and displacing an amount of the uncured liquid thermoset composition such that the uncured liquid thermoset composition forms an inner cover layer having a thickness and thereby mating the first and second half shells; and curing the thermoset inner cover layer to complete the golf ball and then removing the resulting golf ball from the golf ball mold.

22 Claims, 5 Drawing Sheets

U.S. PATENT DOCUMENTS 7,448,965 B2 * 11/2008 Kawamatsu ............ 473/378
2002/0086746 A1 * 7/2002 Bellinger et al. ......... 473/374
2002/0147057 A1 10/2002 Binette et al.
2005/0250602 A1 11/2005 Kennedy, III et al.

* cited by examiner

PROCESS FOR MANUFACTURING GOLF BALLS HAVING MULTI-LAYERED COVERS

CROSS-REFERENCE TO RELATED APPLICATIONS

This application is a continuation of co-pending U.S. patent application Ser. No. 13/088,564, filed Apr. 18, 2011.

FIELD OF THE INVENTION

Processes for manufacturing golf balls having multi-layered covers including a very thin outermost cover layer.

BACKGROUND OF THE INVENTION

Golf balls are generally divided into two classes: solid and wound. Solid golf balls include a solid core of one or more layers, a cover of one or more layers, and optionally one or more intermediate layers. Wound golf balls typically include a solid, hollow, or fluid-filled center, surrounded by tensioned elastomeric material, and a cover. Solid golf balls, as compared with wound balls, are more durable and resilient, providing better distance than wound balls due to their higher initial velocity upon impact with a club face. Meanwhile, the wound construction provides a softer "feel", lower compression and higher spin rate—characteristics often preferred by accomplished golfers who are able to control the ball's flight and positioning.

By altering solid golf ball construction and composition, manufacturers can vary a wide range of playing characteristics such as resilience, durability, spin, and "feel", optimizing each according to various playing abilities and achieving a solid golf ball possessing feel characteristics more like their wound predecessors. For example, by shifting the density (the weight or mass of the golf ball) toward the center of the ball, the moment of inertia of the golf ball can be reduced, thereby increasing the initial spin rate of the ball as it leaves the golf club head as a result of the higher resistance from the golf ball's moment of inertia.

In this regard, core is the "engine" of the golf ball when hit with a club head. That is, it is the spring of the ball and its principal source of resiliency. Meanwhile, the intermediate layers based on ionomers aid in maintaining initial speed, contribute to desired spin rate, and improve playability/impact durability as well as acting as a moisture barrier to protect the cores from the COR loss. The cover, while originally intended to protect the golf ball from scuffing, may also be modified to target a desired spin rate, feel, and playability, even addressing such issues as "lift" and "drag".

Golf ball manufacturers have sought to incorporate and configure materials in the core, intermediate layer and/or cover in order improve performance and achieve desired characteristics. In this regard, multi-layered cover configurations employing a very thin thermoplastic outer cover layer and a much softer thermoset inner cover layer improve durability, resilience and provide a unique spin profile. See e.g., U.S. 2002/0147057 A1 of Binette et al. Heretofore however, such golf balls have been manufactured via conventional compression or injection molding processes—i.e., molding an inner cover layer over the core and molding the outer cover layer over the inner cover layer. Id., infra. These processes are not well-suited for or adapted for constructing golf balls incorporating very thin cover layers, as quality control issues arise including poor concentricity, matability and/or contouring between inner and outer cover layers, as well as lack of consistency in cover layer wall thickness.

Retractable pin injection molding (RPIM) or compression molding methods are the most common methods for molding thermoplastic cover layers around solid cores. Both processes require heat and pressure to form the cover, the pressure required can cause deformation of the core. During the process of compression molding thin covers, the core is severely deformed from the pressure exerted by the melting polymer as the mold closes, causing a "blow out" of the core. Other issues can be roundness of the ball, core shifting, and cover concentricity. Similar issues occur when trying to mold thin covers using the RPIM process resulting from the "pinching" of the core by the retractable pins that center the core as the molten plastic is injected into the mold under high pressure. Similarly, the issues are "blow out" (exposed cores), core shifting, out of roundness, and cover concentricity.

Accordingly, there is a need for a golf ball manufacturing process which addresses and resolves these manufacturing issues.

SUMMARY OF THE INVENTION

The process of the invention for manufacturing golf balls addresses and solves the problems identified above, reliably producing golf balls possessing and displaying concentricity and matability between cover layers, more consistent cover layer wall thickness, and better overall contouring between cover layers. One particular benefit of the process of the invention is that respective dimples of inner and outer cover layers better align with each other and match intimately.

The present invention is therefore directed to a process for manufacturing a golf ball comprising: a first step of forming first and second substantially hemispherical half shells having a non-uniform thickness and comprising a thermoplastic composition, each half shell further having an outer surface and an inner surface, the inner surface forming an hemispherical cavity; a second step of securing the first half shell in a golf ball mold; a third step of securing a core subassembly in a subassembly holder; a fourth step of dispensing an uncured liquid thermoset composition into the hemispherical cavity of the first half shell; a fifth step of inserting a first half of the core subassembly into the hemispherical cavity of the first half shell and displacing an amount of the uncured liquid thermoset composition such that the uncured liquid thermoset composition forms an inner cover layer having a uniform thickness; a sixth step of disengaging the core assembly from the subassembly holder when the thermoset composition has gelled to a point of rigidity; a seventh step of securing the second half shell in a golf ball mold; an eighth step of dispensing the uncured liquid thermoset composition into the hemispherical cavity of the second half shell; a ninth step of inserting a second half of the core subassembly into the hemispherical cavity of the second half shell and displacing an amount of the uncured liquid thermoset composition such that the uncured liquid thermoset composition forms an inner cover layer having a uniform thickness and thereby mating the first and second half shells; and a tenth step of curing the thermoset inner cover layer to complete the golf ball and then removing the resulting golf ball from the golf ball mold.

In another embodiment, the process of the invention for manufacturing a golf ball comprises: a first step of forming first and second substantially hemispherical half shells having a uniform thickness comprising a thermoplastic composition, each half shell further having an outer surface and a non-uniformly contoured inner surface, the inner surface forming an hemispherical inner cavity; a second step of securing the first half shell in a golf ball mold; a third step of securing a core subassembly in a subassembly holder; a fourth step of dispensing an uncured liquid thermoset composition into the hemispherical cavity of the first half shell; a fifth step of inserting a first half of the core subassembly into the hemispherical cavity of the first half shell and displacing an amount of the uncured liquid thermoset composition such that the uncured liquid thermoset composition forms an inner cover layer having a non-uniform thickness; a sixth step of disengaging the core assembly from the subassembly holder when the thermoset composition has gelled to a point of rigidity; a seventh step of securing the second half shell in a golf ball mold; an eighth step of dispensing the uncured liquid thermoset composition into the hemispherical cavity of the second half shell; a ninth step of inserting a second half of the core subassembly into the hemispherical cavity of the second half shell and displacing an amount of the uncured liquid thermoset composition such that the uncured liquid thermoset composition forms an inner cover layer having a non-uniform thickness and thereby mating the first and second half shells; and a tenth step of curing the thermoset inner cover layer to complete the golf ball and then removing the resulting golf ball from the golf ball mold.

In yet another embodiment, the process of the invention for manufacturing a golf ball comprises: a first step of forming first and second substantially hemispherical half shells having a uniform thickness comprising a thermoplastic composition, each half shell further having an outer surface and a non-uniformly contoured inner surface, the inner surface forming an hemispherical inner cavity; a second step of securing the first half shell in a golf ball mold; a third step of securing a core subassembly in a subassembly holder; a fourth step of dispensing an uncured liquid thermoset composition into the hemispherical cavity of the first half shell; a fifth step of inserting a first half of the core subassembly into the hemispherical cavity of the first half shell and displacing an amount of the uncured liquid thermoset composition such that the uncured liquid thermoset composition forms a non-uniformly contoured inner cover layer having a uniform thickness; a sixth step of disengaging the core assembly from the subassembly holder when the thermoset composition has gelled to a point of rigidity; a seventh step of securing the second half shell in a golf ball mold; an eighth step of dispensing the uncured liquid thermoset composition into the hemispherical cavity of the second half shell; a ninth step of inserting a second half of the core subassembly into the hemispherical cavity of the second half shell and displacing an amount of the uncured liquid thermoset composition such that the uncured liquid thermoset composition forms a non-uniformly contoured inner cover layer having a uniform thickness and thereby mating the first and second half shells; and a tenth step of curing the thermoset inner cover layer to complete the golf ball and then removing the resulting golf ball from the golf ball mold.

In still another embodiment, the process of the invention for manufacturing a golf ball comprises: a first step of forming first and second substantially hemispherical half shells having a uniform thickness comprising a thermoplastic composition, each half shell further having a uniformly contoured outer surface and an inner surface which forms an hemispherical cavity; a second step of securing the first half shell in a golf ball mold; a third step of securing a core subassembly in a subassembly holder; a fourth step of dispensing an uncured liquid thermoset composition into the hemispherical cavity of the first half shell; a fifth step of inserting a first half of the core subassembly into the hemispherical cavity of the first half shell and displacing an amount of the uncured liquid thermoset composition such that the uncured liquid thermoset composition forms an inner cover layer having a uniformly contoured inner surface and a uniform thickness; a sixth step of disengaging the core assembly from the subassembly holder when the thermoset composition has gelled to a point of rigidity; a seventh step of securing the second half shell in a golf ball mold; an eighth step of dispensing the uncured liquid thermoset composition into the hemispherical cavity of the second half shell; a ninth step of inserting a second half of the core subassembly into the hemispherical cavity of the second half shell and displacing an amount of the uncured liquid thermoset composition such that the uncured liquid thermoset composition forms an inner cover layer having a uniformly contoured inner surface and a uniform thickness, and thereby mating the first and second half shells; a tenth step of curing the thermoset inner cover layer; an eleventh step of forming dimples in the outer surfaces of the mated first and second half shells, thereby eliminating the uniformity of the contour of the outer surface of the mated first and second half shells; and a twelfth step of removing the resulting golf ball from the golf ball mold.

Alternatively, the process of the invention for manufacturing a golf ball may comprise: providing first and second substantially hemispherical half shells comprising a thermoplastic composition, each half shell further having a dimpled outer surface and an inner surface, the inner surface forming an hemispherical cavity; dispensing an uncured liquid thermoset composition into the hemispherical cavity of the first half shell; providing a core subassembly; inserting a first half of the core subassembly into the hemispherical cavity of the first half shell and displacing an amount of the uncured liquid thermoset composition such that the uncured liquid thermoset composition forms an inner cover layer; dispensing the uncured liquid thermoset composition into the hemispherical cavity of the second half shell; inserting a second half of the core subassembly into the hemispherical cavity of the second half shell and displacing an amount of the uncured liquid thermoset composition such that the uncured liquid thermoset composition forms an inner cover layer and thereby mating the first and second half shells; and curing the thermoset inner cover layer to complete the golf ball.

In another embodiment, dimples are formed in the half shells after the half shells are mated, either before or after the step of curing the thermoset inner cover layer.

The invention is also directed to process for manufacturing a golf ball comprising: providing first and second substantially hemispherical half shells comprising a thermoplastic composition, each half shell having an outer surface and an inner surface which forms an hemispherical cavity; dispensing an uncured liquid thermoset composition into the hemispherical cavity of the first half shell; providing a core subassembly; inserting a first half of the core subassembly into the hemispherical cavity of the first half shell and displacing an amount of the uncured liquid thermoset composition such that the uncured liquid thermoset composition forms a thermoset inner cover layer; dispensing the uncured liquid thermoset composition into the hemispherical cavity of the second half shell; inserting a second half of the core subassembly into the hemispherical cavity of the second half shell and displacing an amount of the uncured liquid thermoset composition such that the uncured liquid thermoset composition forms a thermoset inner cover layer and thereby mating the first and second half shells; curing the thermoset inner cover layer; and forming dimples in the outer surfaces of the mated first and second half shells, thereby eliminating the uniformity of the contour of the outer surface of the mated first and second half shells.

Thus, at least the following relationships are possible between the hemispherical half shells (outer cover layer) and the inner cover layer when forming a golf ball according to the process of the invention:

(1) the hemispherical half shells have a non-uniform thickness and the inner cover layer has a uniform thickness (see FIG. 3 e.g.);

(2) the hemispherical half shells have a uniform thickness and a non-uniformly contoured inner surface, and the inner cover layer has a non-uniform thickness (see FIG. 4 e.g.);

(3) the hemispherical half shells have a uniform thickness and a non-uniformly contoured inner surface and the inner cover layer has a uniform thickness and a non-uniformly contoured inner surface (see FIG. 5, e.g.);

(4) prior to being dimpled, the hemispherical half shells have a uniform thickness and uniformly contoured inner and outer surfaces, and the inner cover layer has a uniform thickness and uniformly contoured inner and outer surfaces (see FIG. 6, e.g.); and (5) the hemispherical half shells have a non-uniform thickness and the inner cover layer has a non-uniform thickness (see FIG. 7, e.g.).

A process of the invention for manufacturing a golf ball may also comprise: a first step of forming first and second substantially hemispherical half shells comprising a thermoplastic composition, each half shell having a uniform thickness X, a non-uniformly contoured outer surface comprising a plurality of dimples, each comprising a maximum depth $D_{max}$, and a non-uniformly contoured inner surface which forms an hemispherical inner cavity; a second step of securing the first half shell in a golf ball mold; a third step of securing a core subassembly in a subassembly holder; a fourth step of dispensing an uncured liquid thermoset composition into the hemispherical cavity of the first half shell; a fifth step of inserting a first half of the core subassembly into the hemispherical cavity of the first half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$; a sixth step of disengaging the core assembly from the subassembly holder when the thermoset composition has gelled to a point of rigidity; a seventh step of securing the second half shell in a golf ball mold; an eighth step of dispensing the uncured liquid thermoset composition into the hemispherical cavity of the second half shell; a ninth step of inserting a second half of the core subassembly into the hemispherical cavity of the second half shell and displacing an amount of the uncured liquid thermoset composition such that the uncured liquid thermoset composition forms a a non-uniformly contoured inner cover layer having a maximum thickness Y and a minimum thickness Z such that $D_{max}=Y-Z$, thereby mating the first and second half shells; and a tenth step of curing the thermoset inner cover layer to complete the golf ball and then removing the resulting golf ball from the golf ball mold. See, for example, FIG. 9.

In another embodiment, the process of the invention for manufacturing a golf ball may comprise: a first step of forming first and second substantially hemispherical half shells comprising a thermoplastic composition, each half shell having a non-uniform thickness, a non-uniformly contoured outer surface and a uniformly contoured inner surface which forms an hemispherical inner cavity; each half shell having a maximum thickness $X'_{max}$ and a minimum thickness $X'_{min}$ such that $X'_{min}=(a\%)X'_{max}$ wherein $50 \leq a$; said non-uniformly contoured outer surface having a plurality of dimples, each dimple comprising a maximum depth $D_{max}$, such that $D_{max}=X'_{max}-(a\%)X'_{max}$; a second step of securing the first half shell in a golf ball mold; a third step of securing a core subassembly in a subassembly holder; a fourth step of dispensing an uncured liquid thermoset composition into the hemispherical cavity of the first half shell; a fifth step of inserting a first half of the core subassembly into the hemispherical cavity of the first half shell and displacing an amount of the uncured liquid thermoset composition such that the uncured liquid thermoset composition forms a uniformly contoured inner cover layer having a uniform thickness Y wherein $X'_{min} \leq Y$; a sixth step of disengaging the core assembly from the subassembly holder when the thermoset composition has gelled to a point of rigidity; a seventh step of securing the second half shell in a golf ball mold; an eighth step of dispensing the uncured liquid thermoset composition into the hemispherical cavity of the second half shell; a ninth step of inserting a second half of the core subassembly into the hemispherical cavity of the second half shell and displacing an amount of the uncured liquid thermoset composition such that the uncured liquid thermoset composition forms a uniformly contoured inner cover layer having a uniform thickness Y wherein $X'_{min} \leq Y$, thereby mating the first and second half shells; and a tenth step of curing the thermoset inner layer to complete the golf ball and then removing the resulting golf ball from the golf ball mold. See, for example, FIG. 10.

In yet another embodiment, the process of the invention for manufacturing a golf ball comprises: providing first and second substantially hemispherical half shells comprising a thermoplastic composition, each half shell having a uniform thickness X, a non-uniformly contoured outer surface comprising a plurality of dimples, each comprising a maximum depth $D_{max}$, and a non-uniformly contoured inner surface which forms an hemispherical inner cavity; dispensing an uncured liquid thermoset composition into the hemispherical cavity of the first half shell; providing a core subassembly; inserting the core subassembly into the hemispherical cavity of the first half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$; dispensing the uncured liquid thermoset composition into the hemispherical cavity of the second half shell; inserting a second half of the core subassembly into the hemispherical cavity of the second half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$, thereby mating the first and second half shells; and curing the thermoset inner cover layer to complete the golf ball.

In still another embodiment, the process of the invention for manufacturing a golf ball comprises: providing first and second substantially hemispherical half shells comprising a thermoplastic composition, each half shell having a non-uniform thickness, a non-uniformly contoured outer surface uniformly contoured inner surface which forms an hemispherical inner cavity, each half shell having a maximum thickness $X'_{max}$ and a minimum thickness $X'_{min}$ such that $X'_{min}=(a\%)X'_{max}$ wherein $50 \leq a$, said non-uniformly contoured outer surface having a plurality of dimples, each dimple comprising a maximum depth $D_{max}$, such that $D_{max}=X'_{max}-(a\%)X'_{max}$, dispensing an uncured liquid thermoset composition into the hemispherical cavity of the first half shell; providing a core subassembly; inserting the core subassembly into the hemispherical cavity of the first half shell and displacing an amount of the uncured liquid thermoset composition such that the uncured liquid thermoset composition forms a uniformly contoured inner cover layer having a uniform thickness Y wherein $X'_{min} \leq Y$, dispensing the uncured liquid thermoset composition into the hemispherical cavity of the second half shell; inserting a second half of the core subassembly into the hemispherical cavity of the second half shell and displacing an amount of the uncured liquid thermoset composition such that the uncured liquid thermoset composition forms a uniformly contoured inner cover layer having a uniform thickness Y wherein $X'_{min} \leq Y$, thereby mating the first and second half shells; and curing the thermoset inner cover layer to complete the golf ball.

In the process of the invention, the substantially hemispherical half shells comprise an outer (outermost) cover layer. The outer cover layer surrounds the inner cover layer which is disposed within and is adjacent to the outer cover layer. Where the cover comprises three layers, the inner cover layer is an intermediate cover layer, being disposed between and adjacent to both the outer cover layer and an innermost cover layer. In a three cover layer embodiment comprising the outer cover layer, inner layer and an innermost cover layer, the innermost cover layer may comprise either a thermoset or thermoplastic polymer. In the process of the invention for forming a three cover layer golf ball, the outermost cover layer is the thinnest cover layer, but the thickness of the innermost cover layer may be either greater than or less that of the inner cover layer as long as the hardness of the innermost cover layer is greater than that of the hardness of the inner cover layer.

Further, each embodiment of the process of the invention may optionally include additional steps of allowing the uncured thermoset liquid in each of the first and second hemispherical cavities to partially cure to a selected state of gel before performing the steps of inserting the first half and second half of the core subassembly into its respective hemispherical cavity.

The mated first and second hemispherical half shells form an outer (outermost) cover layer. In one embodiment, the outer cover layer has a hardness of from about 50 Shore D or greater. In another embodiment, the outer cover layer has a hardness of from about 55 Shore D or greater. In yet another embodiment, the outer cover layer has a hardness of from about 60 Shore D or greater.

In one embodiment, the inner cover layer has a hardness of about 58 Shore D or lower. In another embodiment, the inner cover layer has a hardness of about 54 Shore D or lower. In yet another embodiment, the inner cover layer has a hardness of about 52 Shore D or lower. In still another embodiment, the inner cover layer has a hardness of from about 20 Shore D to about 35 Shore D.

In one embodiment, dimples are formed by of the non-uniform contour of the outer surface of the outer cover layer. In another embodiment, dimples comprise recesses in the non-uniform contour of the outer surface of the outer cover layer. In yet another embodiment, dimples are formed within the uniform contour of the outer surface of the outer cover layer. In still another embodiment, the outer surfaces of the first and second hemispherical shells comprise dimples.

In one embodiment, the process of the invention forms a golf ball comprising dimples having a substantially similar depth. In another embodiment, the process of the invention forms a golf ball comprising dimples having different depths. In yet another embodiment, the process of the invention forms a golf ball comprising first dimples having a substantially similar depth and second dimples having depths different than the depth of the first dimples.

In one embodiment, the dimples have a maximum depth of from about 0.005 inches to about 0.015 inches. In another embodiment, the dimples have a maximum depth of from about 0.0067 inches to about 0.0134 inches.

The outer cover layer may have a thickness of from about 0.003 inches to about 0.030 inches. In another embodiment, the outer cover layer has a thickness of from about 0.005 inches to about 0.025 inches. In yet another embodiment, the outer cover layer has a thickness of from about 0.008 inches to about 0.020 inches.

The inner cover layer may have a thickness that is equal to or greater than the thickness of the hemispherical shells. In one embodiment, the inner cover layer has a thickness of from about 0.010 inches to about 0.110 inches. In another embodiment, the inner cover layer has a thickness of from about 0.015 inches to about 0.060 inches. In yet another embodiment, the inner cover layer has a thickness of from about 0.025 inches to about 0.055 inches. In still another embodiment, the inner cover layer has a thickness of from about 0.020 inches to about 0.040 inches.

In a three cover layer embodiment, the innermost cover layer may have a hardness of 60 Shore D or greater or even 65 Shore D or greater selected from at least ionomers, polyamindes, polyesters, or blends thereof.

As one of ordinary skill in the art would appreciate, for each embodiment disclosed herein, the process of the invention for manufacturing a golf ball may include additional steps not detailed/specified within an embodiment. Alternatively, applications are also envisioned in which the process of the invention for manufacturing a golf ball "consists essentially of" those steps detailed/specified within an embodiment.

Meanwhile, for certain applications, a process of the invention for manufacturing a golf ball may "consist of" only those steps detailed/specified within an embodiment.

DETAILED DESCRIPTION

Figure 1:
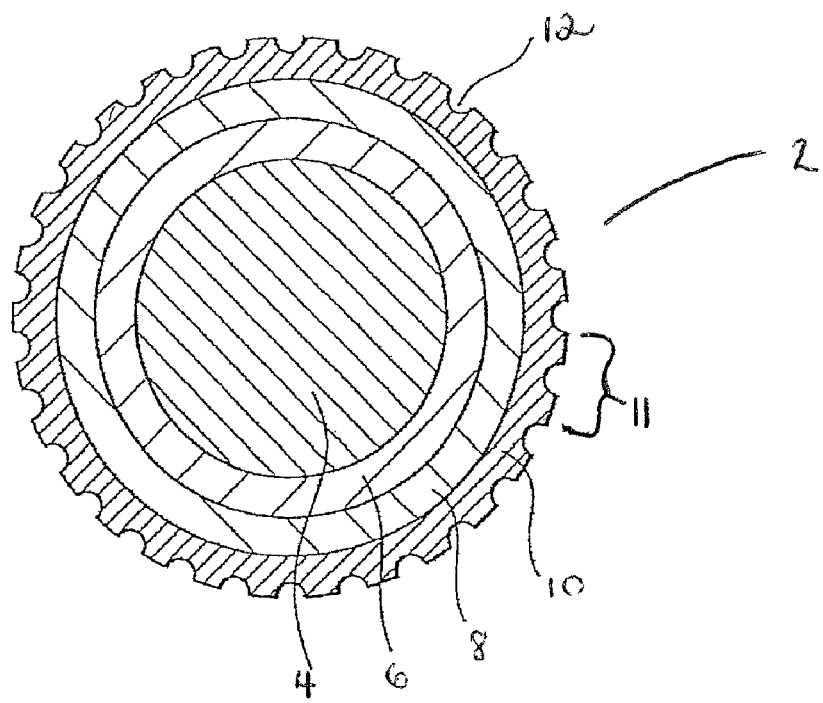
FIG. 1 is a cross-sectional view of a golf ball manufactured according to the process of the invention.

The cores in golf balls manufactured by the process of this invention may be solid, semi-solid, hollow, fluid-filled, or powder-filled. Typically, the cores are solid and made from rubber compositions containing at least a base rubber, free-radical initiator agent, cross-linking co-agent, and fillers. Golf balls having various constructions may be made in accordance with this invention. For example, golf balls having three-piece, four-piece, and five-piece constructions with dual or three-layered cores and cover materials may be made The term, "layer" as used herein means generally any spherical portion of the golf ball. More particularly, in one version, a three-piece golf ball comprising a core and a "dual-cover" is made. In another version, a four-piece golf ball comprising a dual-core and "dual-cover" is made. The dual-core includes an inner core (center) and surrounding outer core layer. The dual-cover includes inner cover and outer cover layers. In yet another construction, a five-piece golf ball having a dual-core, intermediate layer, and dual-cover is made. In still another embodiment, a four piece golf ball comprises a core and a three layer cover.

As used herein, the term, "intermediate layer" means a layer of the ball disposed between the core and cover. The intermediate layer may be considered an outer core layer, or inner cover layer, or any other layer disposed between the inner core and outer cover of the ball. The intermediate layer also may be referred to as a casing or mantle layer. The diameter and thickness of the different layers along with properties such as hardness and compression may vary depending upon the construction and desired playing performance properties of the golf ball and as specified herein.

The inner core of the golf ball may comprise a polybutadiene rubber material. In one embodiment, the ball contains a single core formed of the polybutadiene rubber composition. In a second embodiment, the ball contains a dual-core comprising an inner core (center) and surrounding outer core layer. In yet another version, the golf ball contains a multi-layered core comprising an inner core, intermediate core layer, and outer core layer.

In general, polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh, Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

Suitable polybutadiene rubbers for blending with the base rubber may include BUNA® CB22, BUNA® CB23 and BUNA® CB24, BUNA® 1203G1, 1220, 1221, and BUNA® CBNd-40, commercially available from LANXESS Corporation; BSTE BR-1220 available from BST Elastomers Co. LTD; UBEPOL® 360L and UBEPOL® 150L and UBEPOL-BR rubbers, commercially available from UBE Industries, Ltd. of Tokyo, Japan; Budene 1207, 1208 and 1280, commercially available from Goodyear of Akron, Ohio; SE BR-1220, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; and KARBOCHEM® Neodene 40, 45, and 60, commercially available from Karbochem.

The base rubber may further include polyisoprene rubber, natural rubber, ethylene-propylene rubber, ethylene-propylene diene rubber, styrene-butadiene rubber, and combinations of two or more thereof. Another preferred base rubber is polybutadiene optionally mixed with one or more elastomers such as polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, acrylate rubbers, polyoctenamers, metallocene-catalyzed elastomers, and plastomers. As discussed further below, highly neutralized acid copolymers (HNPs), as known in the art, also can be used to form the core layer as part of the blend. Such compositions will provide increased flexural modulus and toughness thereby improving the golf ball's performance including its impact durability. The base rubber typically is mixed with at least one reactive cross-linking co-agent to enhance the hardness of the rubber composition. Suitable co-agents include, but are not limited to, unsaturated carboxylic acids and unsaturated vinyl compounds. A preferred unsaturated vinyl compound is trimethylolpropane trimethacrylate. The rubber composition is cured using a conventional curing process. Suitable curing processes include, for example, peroxide curing, sulfur curing, high-energy radiation, and combinations thereof. In one embodiment, the base rubber is peroxide cured. Organic peroxides suitable as free-radical initiators include, for example, dicumyl peroxide; n-butyl-4,4-di(t-butylperoxy)valerate; 1,1-di(t-butylperoxy)3,3,5-trimethylcyclohexane; 2,5-dimethyl-2,5-di(t-butylperoxy)hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (for example, trimethylolpropane trimethacrylate); phenylene bismaleimide; and combinations thereof. In a particular embodiment, the cross-linking agent is selected from zinc salts of acrylates, diacrylates, methacrylates, and dimethacrylates. In another particular embodiment, the cross-linking agent is zinc diacrylate ("ZDA"). Commercially available zinc diacrylates include those selected from Cray Valley Resource Innovations Inc. Other elastomers known in the art may also be added, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

Thermoplastic elastomers (TPE) may also be used to modify the properties of the core layers, or the uncured core layer stock by blending with the uncured rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, e.g. with silicone. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride. Any of the Thermoplastic Vulcanized Rubbers (TPV) such as Santoprene® or Vibram® or ETPV® can be used along with a present invention. In one embodiment, the TPV has a thermoplastic as a continuous phase and a cross-linked rubber particulate as a dispersed (or discontinuous) phase. In another embodiment, the TPV has a cross-linked phase as a continuous phase and a thermoplastic as a dispersed (or discontinuous) phase to provide reduced loss in elasticity in order to improve the resiliency of the golf ball.

The rubber compositions also may contain "soft and fast" agents such as a halogenated organosulfur, organic disulfide, or inorganic disulfide compounds. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95 ZnPCTP is commercially available from EchinaChem (San Francisco, Calif.). These compounds also may function as cis-to-trans catalysts to convert some cis bonds in the polybutadiene to trans bonds. Antioxidants also may be added to the rubber compositions to prevent the breakdown of the elastomers. Other ingredients such as accelerators (for example, tetra methylthiuram), processing aids, dyes and pigments, wetting agents, surfactants, plasticizers, as well as other additives known in the art may be added to the rubber composition.

The core may be formed by mixing and forming the rubber composition using conventional techniques. These cores can be used to make finished golf balls by surrounding the core with outer core layer(s), intermediate layer(s), and/or cover materials as discussed further below. In another embodiment, the cores can be formed using highly neutralized polymer (HNP) compositions as disclosed in U.S. Pat. Nos. 6,756,436, 7,030,192, 7,402,629, and 7,517,289. The cores from the highly neutralized polymer compositions can be further cross-linked using any free-radical initiation sources including radiation sources such as gamma or electron beam as well as chemical sources such as peroxides and the like.

Golf balls made in accordance with this invention can be of any size, although the USGA requires that golf balls used in competition have a diameter of at least 1.68 inches and a weight of no greater than 1.62 ounces. For play outside of USGA competition, the golf balls can have smaller diameters and be heavier.

A wide variety of thermoplastic or thermosetting materials can be employed in forming the core, cover layers, or both. These materials include for example, olefin-based copolymer ionomer resins (for example, Surlyn® ionomer resins and Dupont® HPF 1000 and HPF 2000, as well as blends of Surlyn® 7940/Surlyn® 8940 or Surlyn® 8150/Surlyn® 9150 commercially available from E.I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, for example, poly (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from E.I. du Pont de Nemours and Company; polyurethane-based thermoplastic elastomers, such as Elastollan®, commercially available from BASF; synthetic or natural vulcanized rubber; and combinations thereof.

In fact, any of the core, intermediate layer and/or cover layers may include the following materials:

(1) Polyurethanes, such as those prepared from polyols and diisocyanates or polyisocyanates and/or their prepolymers;

(2) Polyureas; and (3) Polyurethane-urea hybrids, blends or copolymers comprising urethane and urea segments.

Polyurethanes and polyureas may constitute either thermoset or thermoplastic compositions, depending on the type of crosslinking bond that is created during formation of the composition. When a polyurethane or polyurea prepolymer is cross linked with a polyfunctional curing agent, covalent bonding occurs, resulting in a thermoset composition. In contrast, polyurethanes and polyureas will be thermoplastic where the crosslinking is due, for example, to hydrogen bonding, resulting in weaker bonds which may be broken upon heating the composition. This distinction explains why thermoset materials generally may not be recycled or reformed into a different shape by heating (at least not easily), whereas thermoplastic materials may so be. The process for manufacturing a golf ball according to the invention is particularly well-suited for forming golf balls having a combination of a very thin, thermoplastic outer cover and a thermoset inner cover having a thickness greater than that of the outer cover layer, providing both COR stability and playability.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Patent Application Publication No. 2005/0176523, which is incorporated by reference in its entirety.

Any polyisocyanate available to one of ordinary skill in the art is suitable for use according to the invention. Exemplary polyisocyanates include, but are not limited to, 4,4'-diphenylmethane diisocyanate (MDI); polymeric MDI; carbodiimide-modified liquid MDI; 4,4'-dicyclohexylmethane diisocyanate ($H_{12}$MDI); p-phenylene diisocyanate (PPDI); m-phenylene diisocyanate (MPDI); toluene diisocyanate (TDI); 3,3'-dimethyl-4,4'-biphenylene diisocyanate; isophoronediisocyanate; 1,6-hexamethylene diisocyanate (HDI); naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof. Additionally, the prepolymers synthesized from these diisocyanates may be "low free monomer," understood by one of ordinary skill in the art to have lower levels of "free" isocyanate monomers, typically less than about 0.1% free isocyanate. Examples of "low free monomer" prepolymers include, but are not limited to Low Free Monomer MDI prepolymers, Low Free Monomer TDI prepolymers, and Low Free Monomer PPDI prepolymers.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate)glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate)glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di- (β-hydroxyethyl)ether; hydroquinone-di-(β-hydroxyethyl) ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In one embodiment of the present invention, saturated polyurethanes are used to form one or more of the cover layers.

Additionally, polyurethane can be replaced with or blended with a polyurea material. Polyureas are distinctly different from polyurethane compositions, giving better shear resistance.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking a polyurea prepolymer with a single curing agent or a blend of curing agents. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; 3,5-diethyltoluene-2,4-diamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof.

Intermediate layers and/or cover layers may also be formed from ionomeric polymers or ionomer blends such as Surlyn 7940/8940 or Surlyn 8150/9150 or from highly-neutralized ionomers (HNP).

In one embodiment, at least one intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100% with a cation source. Suitable cation sources include metal cations and salts thereof, organic amine compounds, ammonium, and combinations thereof. The HNP's can be also be blended with a second polymer component, which, if containing an acid group(s) such as organic acids, or more preferably fatty acids, may be neutralized in a conventional manner, with a suitable cation source. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either fully or partially, with sufficient amount of metal base to achieve the desired neutralization level. The acid copolymers are preferably a-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth)acrylic acid/ethyl acrylate, and ethylene/(meth)acrylic acid/methyl acrylate copolymers.

Ionomers are typically neutralized with a metal cation, such as Li, Na, Mg, K, Ca, or Zn. It has been found that by adding sufficient organic acid or salt of organic acid, along with a suitable base, to the acid copolymer or ionomer, the ionomer can be neutralized, without losing processability, to a level much greater than for a metal cation alone. Preferably, the acid moieties are neutralized greater than about 80%, preferably from 90-100%, most preferably 100% without losing processability. This is accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids may be aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

The golf ball may also contain additives, ingredients, and other materials in amounts that do not detract from the properties of the final composition. These additive materials include, but are not limited to, activators such as calcium or magnesium oxide; fatty acids such as stearic acid and salts thereof; fillers and reinforcing agents such as organic or inorganic particles, for example, clays, talc, calcium, magnesium carbonate, silica, aluminum silicates, zeolites, powdered metals, and organic or inorganic fibers, plasticizers such as dialkyl esters of dicarboxylic acids; surfactants; softeners; tackifiers; waxes; ultraviolet (UV) light absorbers and stabilizers; antioxidants; optical brighteners; whitening agents such as titanium dioxide and zinc oxide; dyes and pigments; processing aids; release agents; and wetting agents. These compositions provide improved melt processability, and a balance of ball performance.

Blowing/foaming agents may also be particularly compatible with the golf ball produced by the process of the invention, including, for example those disclosed in U.S. Pat. No. 7,708,654. Typical physical foaming/blowing agents include volatile liquids such as freons (CFCs), other halogenated hydrocarbons, water, aliphatic hydrocarbons, gases, and solid blowing agents, i.e., compounds that liberate gas as a result of desorption of gas. Preferably, the blowing agent includes an adsorbent. Typical adsorbents include, for example, activated carbon, calcium carbonate, diatomaceous earth, and silicates saturated with carbon dioxide.

Chemical foaming/blowing agents may be incorporated. Chemical blowing agents may be inorganic, such as ammonium carbonate and carbonates of alkali metals, or may be organic, such as azo and diazo compounds, such as nitrogen-based azo compounds. Suitable azo compounds include, but are not limited to, 2,2'-azobis(2-cyanobutane), 2,2'-azobis (methylbutyronitrile), azodicarbonamide, p,p'-oxybis(benzene sulfonyl hydrazide), p-toluene sulfonyl semicarbazide, p-toluene sulfonyl hydrazide. Other blowing agents include any of the Celogens®, sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Other possible blowing agents include agents that liberate gases as a result of chemical interaction between components such as mixtures of acids and metals, mixtures of organic acids and inorganic carbonates, mixtures of nitriles and ammonium salts, and the hydrolytic decomposition of urea.

Alternatively, low specific gravity can be achieved by incorporating low density fillers or agents such as hollow fillers or microspheres in the polymeric matrix, where the cured composition has the preferred specific gravity. Moreover, the polymeric matrix can be foamed to decrease its specific gravity, microballoons, or other low density fillers as described in U.S. Pat. No. 6,692,380 ("'380 patent"). The '380 patent is incorporated by reference in its entirety.

Blends including non-ionomeric and olefin-based ionomeric polymers may also be incorporated to form a golf ball layer. Examples of non-ionomeric polymers include vinyl resins, polyolefins including those produced using a single-site catalyst or a metallocene catalyst, polyurethanes, polyureas, polyamides, polyphenylenes, polycarbonates, polyesters, polyacrylates, engineering thermoplastics, and the like. Also, in one embodiment of the invention, processability of the golf ball of the invention may even be enhanced by incorporating in the core a metallocene-catalyzed polybutadiene.

Olefin-based ionomers, such as ethylene-based copolymers, normally include an unsaturated carboxylic acid, such as methacrylic acid, acrylic acid, or maleic acid. Other possible carboxylic acid groups include, for example, crotonic, maleic, fumaric, and itaconic acid. "Low acid" and "high acid" olefin-based ionomers, as well as blends of such ionomers, may be used. In general, low acid ionomers are considered to be those containing 16 wt. % or less of carboxylic acid, whereas high acid ionomers are considered to be those containing greater than 16 wt. % of carboxylic acid. The acidic group in the olefin-based ionic copolymer is partially or totally neutralized with metal ions such as zinc, sodium, lithium, magnesium, potassium, calcium, manganese, nickel, chromium, copper, or a combination thereof. For example, ionomeric resins having carboxylic acid groups that are neutralized from about 10 percent to about 100 percent may be used. In one embodiment, the acid groups are partially neutralized. That is, the neutralization level is from 10 to 80%, more preferably 20 to 70%, and most preferably 30 to 50%. In another embodiment, the acid groups are highly or fully neutralized. Or, the neutralization level may be from about 80 to 100%, more preferably 90 to 100%, and most preferably 95 to 100%. The blend may contain about 5 to about 30% by weight of the moisture barrier composition and about 95 to about 70% by weight of a partially, highly, or fully-neutralized olefin-based ionomeric copolymer. The above-mentioned blends may contain one or more suitable compatibilizers such as glycidyl acrylate or glycidyl methacrylate or maleic anhydride containing-polymers.

In one embodiment, the overall golf ball produced by the process of the invention has a compression of from about 25 to about 110. In another embodiment, the overall golf ball has a compression of from about 35 to about 100. In yet another embodiment, the overall golf ball has a compression of from about 45 to about 95. In still another embodiment, the compression may be from about 55 to about 85, or from about 65 to about 75. Meanwhile, the compression may also be from about 50 to about 110, or from about 60 to about 100, or from about 70 to about 90, or even from about 80 to about 110.

Generally, in golf balls produced by the process of the invention, the overall golf ball COR is at least about 0.780. In another embodiment, the overall golf ball COR is at least about 0.788. In yet another embodiment, the overall golf ball COR is at least about 0.791. In still another embodiment, the overall golf ball COR is at least about 0.794. Also, the overall golf ball COR may be at least about 0.797. The overall golf ball COR may even be at least about 0.800, or at least about 0.803, or at least about 0.812.

The core, intermediate layer(s) and/or cover layers may contain sections having the same hardness or different hardness levels. That is, there can be uniform hardness throughout the different sections of the core or there can be hardness gradients across the layers. For example, in single cores, there may be a hard-to-soft gradient (a "positive" gradient) from the surface of the core to the geometric center of the core. In other instances, there may be a soft-to-hard gradient (a "negative" gradient) or zero hardness gradient from the core's surface to the core's center. For dual core golf balls, the inner core layer may have a surface hardness that is less than the geometric center hardness to define a first "negative" gradient. As discussed above, an outer core layer may be formed around the inner core layer, and the outer core layer may have an outer surface hardness less than its inner surface hardness to define a second "negative" gradient. In other versions, the hardness gradients from surface to center may be hard-to-soft ("positive"), or soft-to-hard ("negative"), or a combination of both gradients. In still other versions the hardness gradients from surface to center may be "zero" (that is, the hardness values are substantially the same.) Methods for making cores having positive, negative, and zero hardness gradients are known in the art as described in, for example, U.S. Pat. Nos. 7,537,530; 7,537,529; 7,427,242; and 7,410,429, the disclosures of which are hereby incorporated by reference.

A golf ball according to the invention may therefore achieve various hardness gradients therein. For example, the golf ball made by the process of the invention may be incorporate a single-solid core having a "positive" hardness gradient (that is, the outer surface of the core is harder than its geometric center.) In a second embodiment, the core may be a dual-core comprising an inner core and a surrounding outer core layer. The inner core has a "positive" hardness gradient and the outer core layer has a "negative" hardness gradient (that is, the outer surface of the outer core layer is softer than the inner surface of the outer core layer.) Other embodiments of golf balls having various combinations of positive, negative, and zero hardness gradients may be made in accordance with this invention. For example, the inner core may have a positive hardness gradient and the outer core layer also may have a positive hardness gradient. In another example, the inner core may have a positive hardness gradient and the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center Shore C hardness gradient of less than 8, preferably less than 5 and most preferably less than 3 and may have a value of zero or negative 1 to negative 25. The term, "negative hardness gradient" as used herein, means a surface to center Shore C hardness gradient of less than zero. The terms, zero hardness gradient and negative hardness gradient, may be used herein interchangeably to refer to hardness gradients of negative 1 to negative 25. The term, "positive hardness gradient" as used herein, means a surface to center Shore C hardness gradient of 8 or greater, preferably 10 or greater, and most preferably 20 or greater. By the term, "steep positive hardness gradient" as used herein, it is meant surface to center Shore C hardness gradient of 20 or greater, more preferably 25 or greater, and most preferably 30 or greater. Methods for measuring the hardness of the inner core and surrounding layers and determining the hardness gradients are discussed in further detail below.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indentor before a surface hardness reading is obtained. A calibrated, digital durometer, capable of reading to 0.1 hardness units may be used for the hardness measurements. The digital durometer is attached to, and its foot made parallel to, the base of an automatic stand. The weight on the durometer and attack rate conform to ASTM D-2240. In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers, and thickness of the various layers. It also should be understood that the two measurement techniques are not linearly related and, therefore, one hardness value cannot easily be correlated to the other. Shore C hardness was measured according to the test methods D-2240.

Several different methods can be used to measure compression, including Atti compression, Riehle compression, load/deflection measurements at a variety of fixed loads and offsets, and effective modulus. See, e.g., *Compression by Any Other Name, Science and Golf IV, Proceedings of the World Scientific Congress of Golf* (Eric Thain ed., Routledge, 2002) ("J. Dalton") The term compression, as used herein, refers to Atti or PGA compression and is measured using an Atti compression test device. A piston compresses a ball against a spring and the piston remains fixed while deflection of the spring is measured at 1.25 mm (0.05 inches). Where a core has a very low stiffness, the compression measurement will be zero at 1.25 mm. In order to measure the compression of a core using an Atti compression tester, the core must be shimmed to a diameter of 1.680 inches because these testers are designed to measure objects having that diameter. Atti compression units can be converted to Riehle (cores), Riehle (balls), 100 kg deflection, 130-10 kg deflection or effective modulus using the formulas set forth in *J. Dalton*. The approximate relationship that exists between Atti or PGA compression and Riehle compression can be expressed as: (Atti or PGA compression)=(160-Riehle Compression). Thus, a Riehle compression of 100 would be the same as an Atti compression of 60.

COR, as used herein, is determined by firing a golf ball or golf ball subassembly (e.g., a golf ball core) from an air cannon at two given velocities and calculating the COR at a velocity of 125 ft/s. Ball velocity is calculated as a ball approaches ballistic light screens which are located between the air cannon and a steel plate at a fixed distance. As the ball travels toward the steel plate, each light screen is activated, and the time at each light screen is measured. This provides an incoming transit time period inversely proportional to the ball's incoming velocity. The ball impacts the steel plate and rebounds through the light screens, which again measure the time period required to transit between the light screens. This provides an outgoing transit time period inversely proportional to the ball's outgoing velocity. COR is then calculated as the ratio of the outgoing transit time period to the incoming transit time period, $COR=V_{out}/V_{in}=T_{in}/T_{out}$. Preferably, a golf ball according to the present invention has a COR of at least about 0.78, more preferably, at least about 0.80.

The spin rate of a golf ball also remains an important golf ball characteristic. High spin rate allows skilled players more flexibility in stopping the ball on the green if they are able to control a high spin ball. On the other hand, recreational players often prefer a low spin ball since they do not have the ability to intentionally control the ball, and lower spin balls tend to drift less off the green.

Golf ball spin is dependent on variables including, for example, distribution of the density or specific gravity within a golf ball. For example, when the center has a higher density or specific gravity than the outer layers, a lower moment of inertia results which increases spin rate. Alternatively, when the density or specific gravity is concentrated in the outer regions of the golf ball, a higher moment of inertia results with a lower spin rate. The moment of inertia for a golf ball of the invention may be from about 0.410 oz-in$^2$ to about 0.470 oz-in$^2$. The moment of inertia for a one piece ball that is 1.62 ounces and 1.68 inches in diameter may be approximately 0.4572 oz-in$^2$, which is the baseline moment of inertia value.

Accordingly, by varying the materials and the density of the regions of each core or cover layer, different moments of inertia may be achieved for the golf ball of the present invention. In one embodiment, the resulting golf ball has a moment of inertia of from about to 0.440 to about 0.455 oz-in$^2$. In another embodiment, the golf balls of the present invention have a moment of inertia of from about 0.456 oz-in$^2$ to about 0.470 oz-in$^2$. In yet another embodiment, the golf ball has a moment of inertia of from about 0.450 oz-in$^2$ to about 0.460 oz-in$^2$.

FIG. 1 depicts a golf ball 2 which may be manufactured according to one embodiment of the process of the invention. In golf ball 2, core 4 is surrounded by innermost cover layer 6, which is surrounded by inner cover layer 8, which in turn is surrounded by outer cover layer 10. Innermost cover layer 6 comprises a hard stiff thermoplastic or thermoset polymer and has a hardness of about 60 Shore D or greater. Meanwhile, inner cover layer 8 comprises a thermoset material, and being the softest cover layer in either a 2 or 3 cover layer arrangement, has a hardness of about 58 Shore D or less. The outer cover layer 10 has a maximum thickness of less than about 0.030" and equal to or less than that of the inner layer 8. Outer cover layer 10 has a non-uniformly contoured outer surface 11, comprises a thermoplastic material and has a hardness of about 50 Shore D or greater. The non-uniformly contoured outer surface 11 comprises dimples 12.

Figure 2:
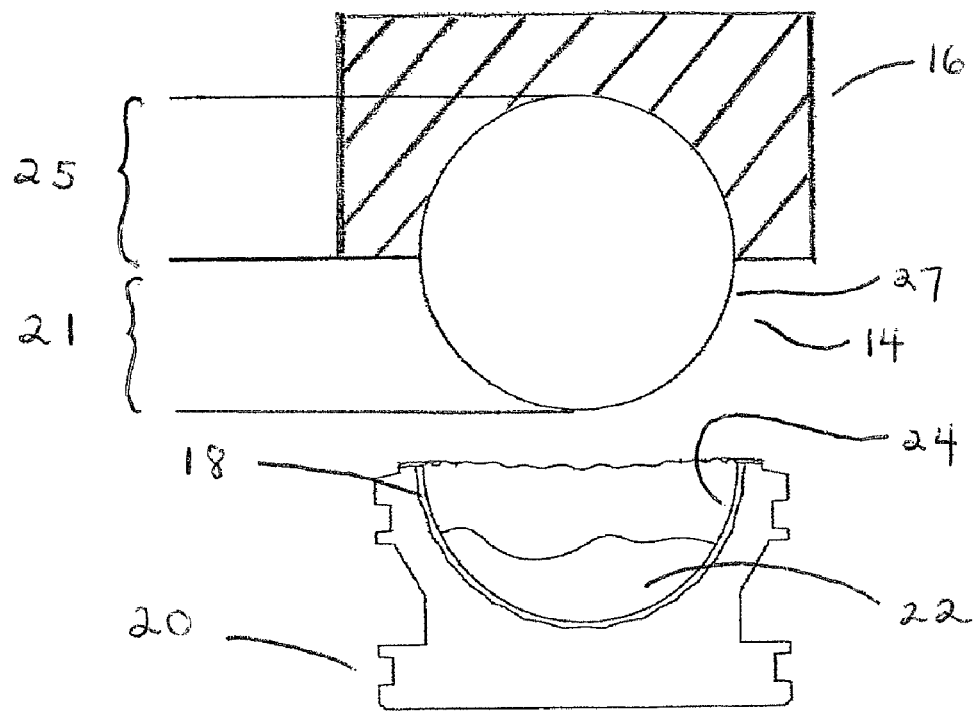
FIG. 2 is one embodiment of a device for manufacturing a golf ball according to the process of the invention.

FIG. 2 represents one device for accomplishing the process of the invention. In FIG. 2, core subassembly perform 14 is secured in core holding fixture/centering tooling 16. Preformed half shell 18 is fixtured in golf ball mold 20. Liquid thermoset material 22 is dispensed into half shell 18. Holding fixture 16 is urged toward golf ball mold 20 so that a first half 21 of core subassembly perform 14 displaces an amount of liquid thermoset material 22 thereby forming an inner cover layer which follows the contour of an inner surface 24 of the preformed half shell 18. When the inner cover layer is formed to a point of rigidity, holding fixture 16 is removed, leaving core assembly 14 secured in the golf ball mold 20, which becomes the centering tooling for forming the remainder of the inner cover layer between a second preformed half shell and a second half 25 of core subassembly perform 14.

Where the process for manufacturing a golf ball forms a three layer cover, an innermost half shell (not shown in FIG. 2) may be secured/arranged adjacent the core subassembly perform 14 and then this combination urged toward golf ball mold 20 to displace the thermoset liquid 22. In this embodiment, outer surface 27 of core subassembly perform 14 is uniformly contoured, but embodiments are also envisioned in which outer surface 27 of the core subassembly 14 is non-uniformly contoured.

Figure 3:
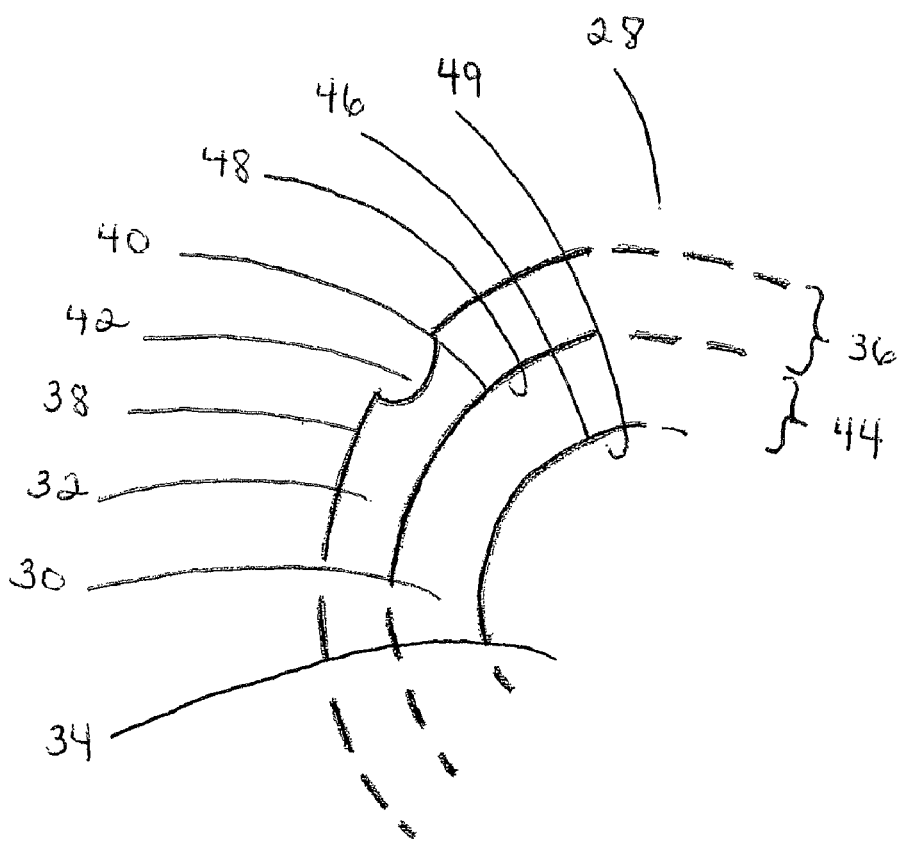
FIG. 3 is a cross-sectional view of an outer portion of a golf ball which may be manufactured according to one embodiment of the process of the invention.

FIG. 3 depicts golf ball 28 made according to one embodiment of the process of the invention. Inner cover layer 30 is formed within outer cover layer 32 and adjacent core 34. Outer cover layer 32 has non-uniform thickness 36, an outer surface 38 having a non-uniform contour, and an inner surface 40 having a uniform contour. Dimples 42 are formed within the non-uniform contour of outer surface 38. Meanwhile, inner cover layer 30 has uniform thickness 44 and inner and outer surfaces 46 and 48, respectively, each having a uniform contour. In this embodiment, surface 49 of core 34 is uniformly contoured.

Figure 4:
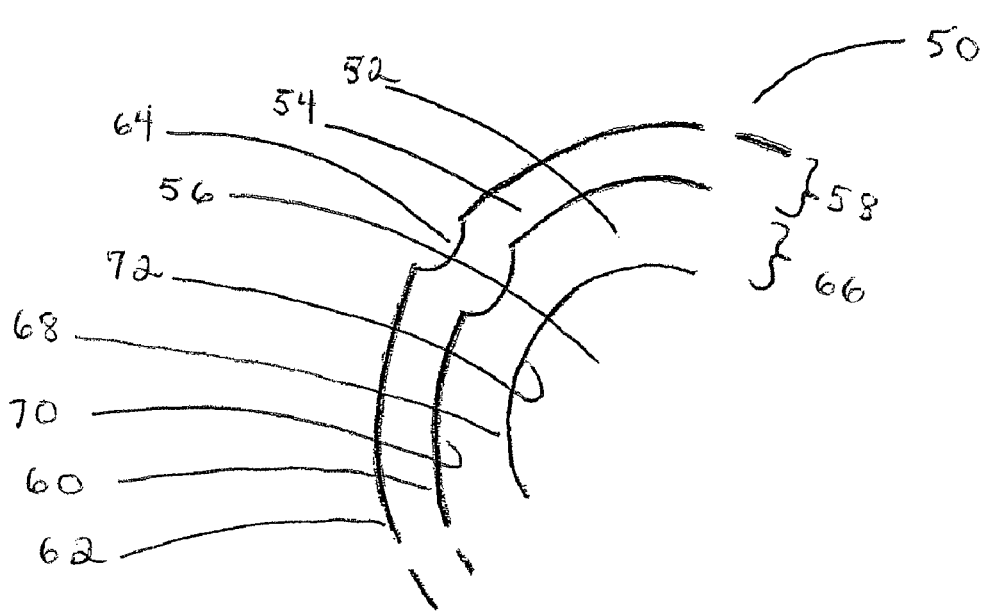
FIG. 4 is a cross-sectional view of an outer portion of a golf ball which may be manufactured according to another embodiment of the process of the invention.

FIG. 4 depicts golf ball 50 made according to one embodiment of the process of the invention. Inner cover layer 52 is formed within outer cover layer 54 and adjacent core 56. Outer cover layer 54 has uniform thickness 58 and inner and outer surfaces 60 and 62, respectively, each having a non-uniform contour. Dimples 64 are formed within the non-uniform contour of outer surface 62. Meanwhile, inner cover layer 52 has non-uniform thickness 66, an inner surface 68 having a uniform contour and an outer surface 70 having a non-uniform contour. In this embodiment, outer surface 72 of core 56 is uniformly contoured.

Figure 5:
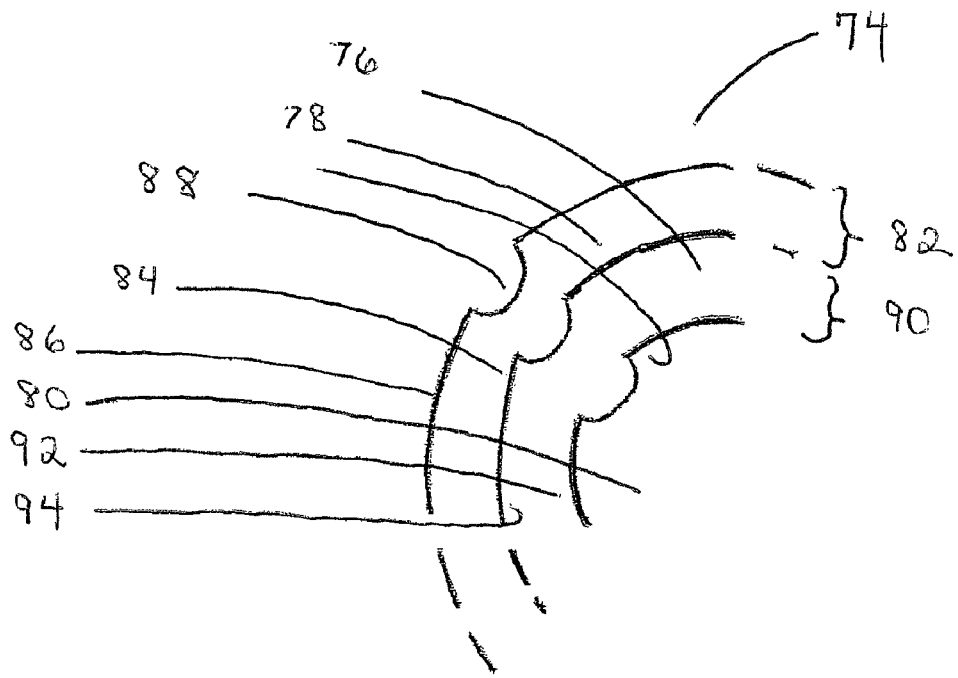
FIG. 5 is a cross-sectional view of an outer portion of a golf ball which may be manufactured according to still another embodiment of the process of the invention.

FIG. 5 depicts golf ball 74 made according to one embodiment of the process of the invention. Inner cover layer 76 is formed within outer cover layer 78 and adjacent core 80. Outer cover layer 78 has uniform thickness 82 and inner and outer surfaces 84 and 86, respectively, each having a non-uniform contour. Dimples 88 are formed within the non-uniform contour of outer surface 86. Meanwhile, inner cover layer 76 has a uniform thickness 90, and inner and outer surfaces 92 and 94, respectively, each having a non-uniform contour. In this embodiment, outer surface 96 of core 80 is non-uniformly contoured.

Figure 6:
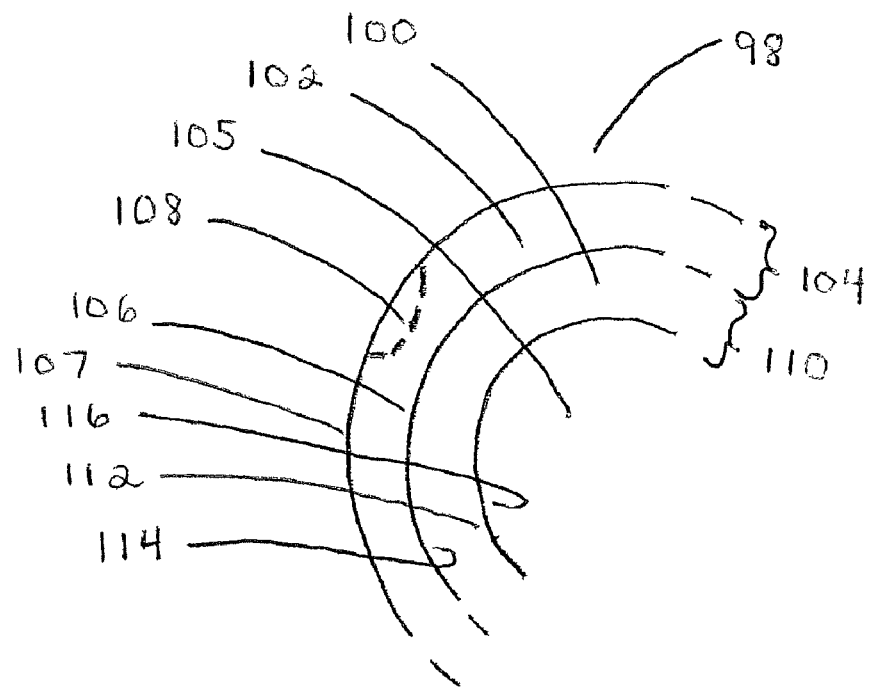
FIG. 6 is a cross-sectional view of an outer portion of a golf ball which may be manufactured according to yet another embodiment of the process of the invention.

FIG. 6 depicts golf ball 98 made according to one embodiment of the process of the invention. Inner cover layer 100 is formed within outer cover layer 102 and adjacent core 105. Outer cover layer 102 initially has a uniform thickness 104 and uniformly contoured inner and outer surfaces 106 and 107 until dimples 108 are formed within outer surface 107 after inner cover layer 100 is formed within the outer cover layer 102. Inner cover layer 100 has a uniform thickness 110 and uniformly contoured inner and outer surfaces 112 and 114, respectively. In this embodiment, the outer surface 116 of core 105 is uniformly contoured.

Figure 7:
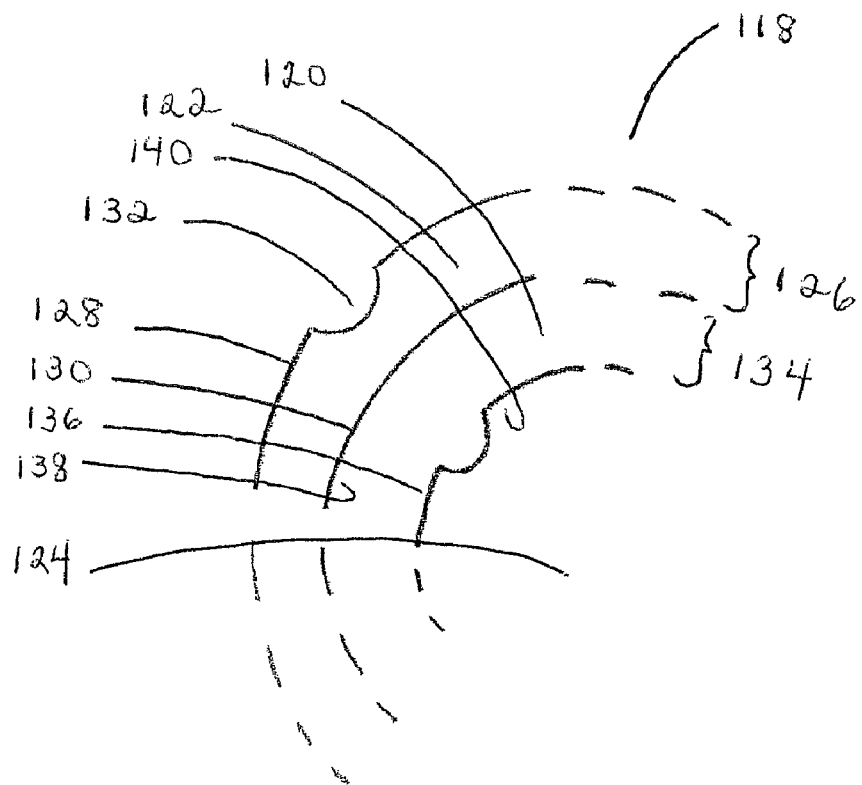
FIG. 7 is a cross-sectional view of an outer portion of a golf ball which may be manufactured according to a different embodiment of the process of the invention.

FIG. 7 depicts golf ball 118 made according to one embodiment of the process of the invention. Inner cover layer 120 is formed within outer cover layer 122 and adjacent core 124. Outer cover layer 122 has a non-uniform thickness 126, an outer surface 128 having a non-uniform contour, and an inner surface 130 having a uniform contour. Dimples 132 are formed within the non-uniform contour of outer surface 128. Meanwhile, inner cover layer 120 has a non-uniform thickness 134, an inner surface 136 having a non-uniform contour and an outer surface 138 having a uniform contour. In this embodiment, outer surface 140 of core 124 is non-uniformly contoured.

Figure 8:
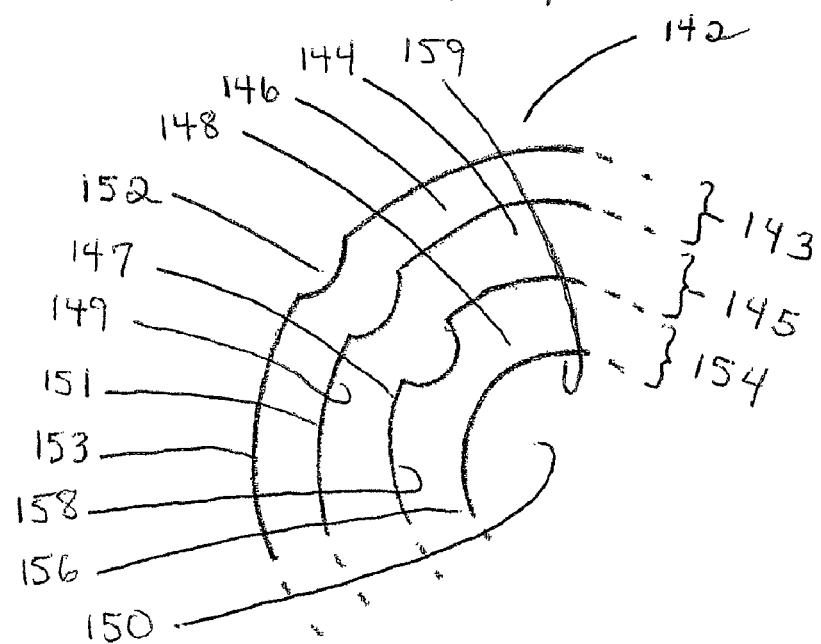
FIG. 8 is a cross-sectional view of an outer portion of a golf ball which may be manufactured according to a further embodiment of the process of the invention.

FIG. 8 depicts golf ball 142 made according to one embodiment of the process of the invention. Inner cover layer 144 is formed within outer cover layer 146 and adjacent an innermost cover layer 148, which in turn is adjacent to and surrounds core 150. Each of outer cover layer 146 and inner cover layer 144 have uniform thicknesses 143 and 145. Furthermore, each of inner cover layer 144 and outer cover layer 146 have inner and outer surfaces 147, 149, 151 and 153, respectively, each of which are non-uniformly contoured. Dimples 152 are formed within the non-uniform contour of outer surface 153. Meanwhile, innermost cover layer 148 has a non-uniform thickness 154, a uniformly contoured inner surface 156 and a non-uniformly contoured outer surface 158. In this embodiment, outer surface 159 of core 150 is uniformly contoured.

Figure 9:
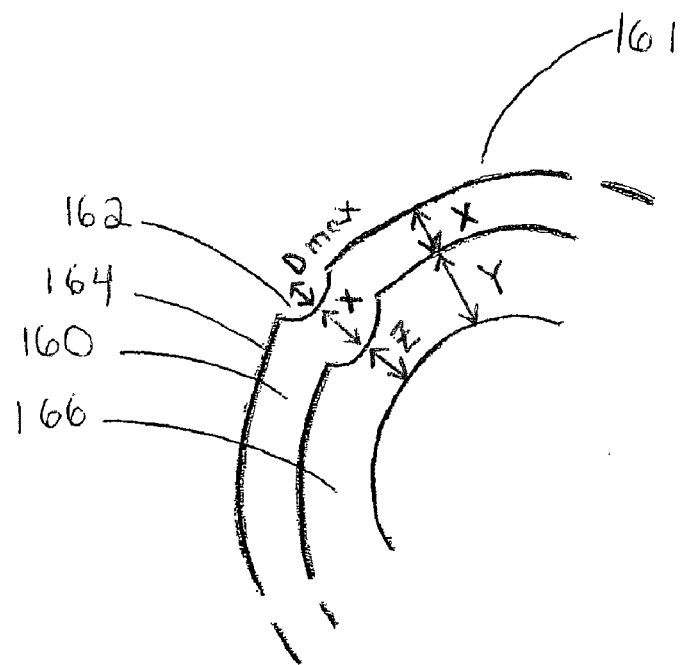
FIG. 9 is the cross sectional view of an outer portion of a golf ball which may be manufactured according to the process of the invention, detailing one possible relationship between golf ball cover layers.
Figure 10:
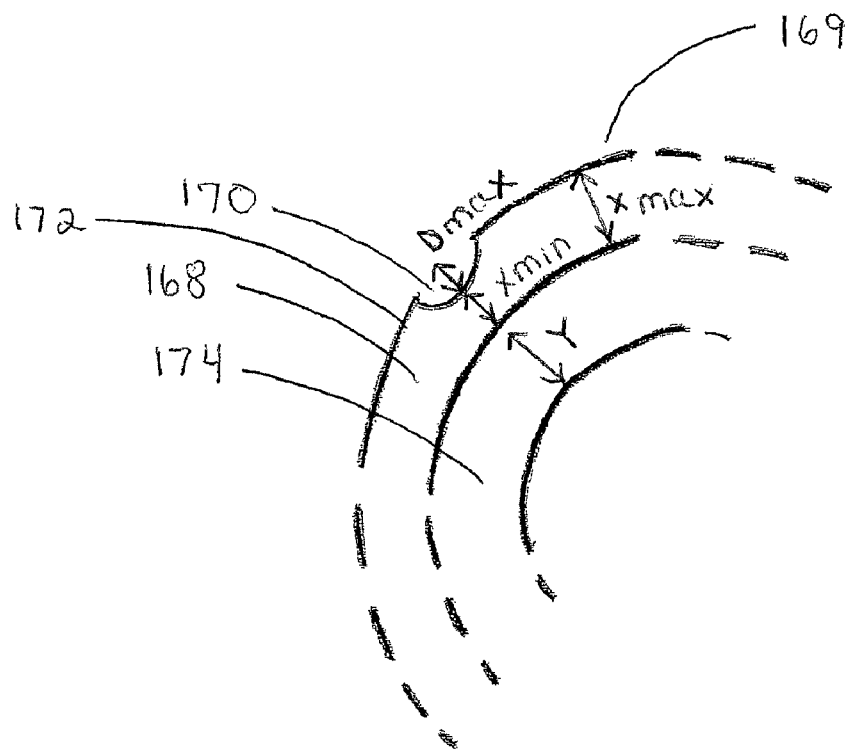
FIG. 10 is the cross sectional view of, an outer portion of a golf ball which may be manufactured according to the process of the invention, detailing another possible relationship between golf ball cover layers.

FIGS. 9 and 10 demonstrate some of the relationships which may exist between cover layers. In FIG. 9, outer cover layer 160 of golf ball 161 has a uniform thickness X. Dimples 162, having a maximum thickness Dmax, are disposed within the non-uniform contour of outer surface 164 of outer cover layer 160. Inner cover layer 166 has a maximum thickness Y and a minimum thickness Z. Thus, in this golf ball, $$D\text{max}+X+Z=X+Y \text{ and therefore,}$$

$$D\text{max}=Y-Z$$

Dmax herein may be confirmed according to the procedure detailed in U.S. Pat. No. 7,226,369 of Aoyama et al. ("Aoyama"), hereby incorporated by reference herein, as the distance measured along a ball radius from the phantom surface of the ball to the deepest point on the dimple. See Aoyama at col. 11, line 64 to col. 12, line 34 and FIG. 7.

In FIG. 10, outer cover layer 168 of golf ball 169 has a maximum thickness X'max and a minimum thickness X'min Dimples 170 having a maximum thickness Dmax are disposed within the non-uniform contour of outer surface 172 of outer cover layer 168. Inner cover layer 174 has a uniform thickness Y. Thus, in this golf ball, $$Y+X'\text{min}+D\text{max}=Y+X'\text{max, and}$$

where X'min=(a %)(X'max) and 50≦a,
then Dmax=Y−Y+X'max−(a %)(X'max) so
Dmax=X'max−(a %)(X'max).

Unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include reasonable variations of the numerical values and/or materials and/or components discussed above. Hence, the numerical values stated above and claimed below specifically include those values and the values that are approximate to those stated and claimed values. Therefore, it will be understood that the appended claims are intended to cover all such modifications and embodiments, which would come within the spirit and scope of the present invention.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of equipment. Such modifications are also intended to fall within the scope of the appended claims.

While any of the embodiments herein may have any known dimple number and pattern, a preferred number of dimples is 252 to 456, and more preferably is 328 to 392. The dimples may comprise any width, depth, and edge angle and patterns which satisfy the relationships defined between cover layers as disclosed herein. The parting line configuration of said pattern may be either a straight line or a staggered wave parting line (SWPL). In one embodiment, the golf ball has 328, 330, 332, or 392 dimples, comprises 5 to 7 dimples sizes, and the parting line is a SWPL.

In any of these embodiments the single-layer core may be replaced with a two or more layer core wherein at least one core layer has a negative hardness gradient. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range.

Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

What is claimed is:

1. A process for manufacturing a golf ball, comprising:
   a first step of forming first and second substantially hemispherical half shells comprising a thermoplastic composition, each half shell having a uniform thickness X, a non-uniformly contoured outer surface comprising a plurality of dimples, each comprising a maximum depth $D_{max}$, and a non-uniformly contoured inner surface which forms an hemispherical inner cavity,
   a second step of securing the first half shell in a golf ball mold;
   a third step of securing a core subassembly in a subassembly holder;
   a fourth step of dispensing an uncured liquid thermoset composition into the hemispherical cavity of the first half shell;
   a fifth step of inserting a first half of the core subassembly into the hemispherical cavity of the first half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$, a sixth step of disengaging the core assembly from the subassembly holder when the thermoset composition has gelled to a point of rigidity;

a seventh step of securing the second half shell in a golf ball mold;

an eighth step of dispensing the uncured liquid thermoset composition into the hemispherical cavity of the second half shell;

a ninth step of inserting a second half of the core subassembly into the hemispherical cavity of the second half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$, thereby mating the first and second half shells;

a tenth step of curing the thermoset inner cover layer to complete the golf ball and then removing the resulting golf ball from the golf ball mold.

2. The process of claim 1, wherein the step of mating the first and second hemispherical half shells forms an outer cover layer.

3. The process of claim 2, wherein the outer cover layer has a hardness of from about 50 Shore D or greater.

4. The process of claim 2, wherein the outer cover layer has a hardness of from about 55 Shore D or greater.

5. The process of claim 2, wherein the outer cover layer has a hardness of from about 60 Shore D or greater.

6. The process of claim 1, wherein the inner cover layer has a hardness of about 58 Shore D or lower.

7. The process of claim 1, wherein the inner cover layer has a hardness of about 54 Shore D or lower.

8. The process of claim 1, wherein the inner cover layer has a hardness of about 52 Shore D or lower.

9. The process of claim 1, wherein the inner cover layer has a hardness of from about 20 Shore D to about 50 Shore D.

10. The process of claim 1, wherein the outer surfaces of the first and second substantially hemispherical shells are non-uniformly contoured.

11. The process of claim 1, wherein the inner surfaces of the substantially hemispherical shells are uniformly contoured.

12. The process of claim 1, wherein dimples are formed within the non-uniform contour of the outer surface of the outer cover layer.

13. The process of claim 12, wherein the dimples have a maximum depth of from about 0.005 inches to about 0.015 inches.

14. The process of claim 12, wherein the dimples have a maximum depth of from about 0.0067 inches to about 0.0134 inches.

15. The process of claim 12, wherein the outer cover layer has a thickness of from about 0.003 inches to about 0.030 inches.

16. The process of claim 1, wherein the inner cover layer has a thickness that is equal to or greater than the thickness of the hemispherical shells.

17. The process of claim 1, wherein the inner cover layer has a thickness of from about 0.010 inches to about 0.110 inches.

18. The process of claim 1, wherein the inner cover layer has a thickness of from about 0.015 inches to about 0.060 inches.

19. The process of claim 1, wherein the inner cover layer has a thickness of from about 0.020 inches to about 0.040 inches.

20. The process of claim 1, wherein the thermoplastic material is an ionomer.

21. The process of claim 1, wherein the thermoplastic material is an ionomer blend.

22. A process for manufacturing a golf ball, comprising:

providing first and second substantially hemispherical half shells comprising a thermoplastic composition, each half shell having a uniform thickness X, a non-uniformly contoured outer surface comprising a plurality of dimples, each comprising a maximum depth $D_{max}$, and a non-uniformly contoured inner surface which forms an hemispherical inner cavity, dispensing an uncured liquid thermoset composition into the hemispherical cavity of the first half shell;

providing a core subassembly;

inserting the core subassembly into the hemispherical cavity of the first half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$, dispensing the uncured liquid thermoset composition into the hemispherical cavity of the second half shell;

inserting a second half of the core subassembly into the hemispherical cavity of the second half shell and displacing an amount of the uncured liquid thermoset composition such that the uncured liquid thermoset composition forms a non-uniformly contoured inner cover layer having a maximum thickness Y and a minimum thickness Z such that $D_{max}=Y-Z$, thereby mating the first and second half shells; and curing the thermoset inner cover layer to complete the golf ball.

* * * * *